United States Patent
Massari et al.

(10) Patent No.: US 9,764,803 B2
(45) Date of Patent: Sep. 19, 2017

(54) METHOD OF LAYING A PIPELINE FROM A LAYING VESSEL ONTO THE BED OF A BODY OF WATER, AND LAYING VESSEL

(71) Applicant: SAIPEM S.p.A., San Donato Milanese (IT)

(72) Inventors: Giovanni Massari, Venice (IT); Matteo Scarpa, San Donato Milanese (IT)

(73) Assignee: SAIPEM S.p.A., San Donato Milanese (IT)

( * ) Notice: Subject to any disclaimer, the term of this patent is extended or adjusted under 35 U.S.C. 154(b) by 0 days.

(21) Appl. No.: 14/714,853

(22) Filed: May 18, 2015

(65) Prior Publication Data

US 2015/0274264 A1     Oct. 1, 2015

Related U.S. Application Data

(63) Continuation of application No. 13/696,845, filed as application No. PCT/IB2011/000984 on May 10, 2011, now Pat. No. 9,057,462.

(30) Foreign Application Priority Data

May 10, 2010   (IT) .............................. MI2010A0829

(51) Int. Cl.
   *F16L 1/19*     (2006.01)
   *B63B 35/03*    (2006.01)
   (Continued)

(52) U.S. Cl.
   CPC .............. *B63B 35/03* (2013.01); *B63B 35/04* (2013.01); *F16L 1/12* (2013.01); *F16L 1/161* (2013.01);
   (Continued)

(58) Field of Classification Search
   CPC ... F16L 1/19; F16L 1/225; F16L 1/235; B63B 35/03
   (Continued)

(56) References Cited

U.S. PATENT DOCUMENTS

| 4,257,718 A | 3/1981 | Rosa et al. |
| 4,827,142 A | 5/1989 | Hatje |

(Continued)

FOREIGN PATENT DOCUMENTS

| GB | 2 265 685 A | 10/1993 |
| WO | WO 00/05525 | 2/2000 |

(Continued)

OTHER PUBLICATIONS

International Search Report and Written Opinion for International Appl. No. PCT/IB2011/000984, European Patent Office, The Netherlands, mailed on Aug. 3, 2011, 7 pages.

(Continued)

*Primary Examiner* — John Kreck
*Assistant Examiner* — Carib Oquendo
(74) *Attorney, Agent, or Firm* — Sterne, Kessler, Goldstein & Fox P.L.L.C.

(57) ABSTRACT

A method of laying a pipeline from a laying vessel into a body of water includes guiding the pipeline along a supporting structure of a laying ramp. The method also includes acquiring a first data item correlated to a position of the pipeline at a free end of the laying ramp using an optical sensor or an acoustic sensor. The method further includes determining whether the acquired first data item is within an acceptance range predetermined as a function of a configuration of the supporting structure and a size of the pipeline. Additionally, the method includes emitting an control signal when the acquired first data item is not within the acceptance range. Determining whether the acquired first data item is within the acceptance range includes processing the acquired first data item to compare it the first data item to an information stored in a memory.

19 Claims, 4 Drawing Sheets

(51) Int. Cl.
   *F16L 1/225*   (2006.01)
   *F16L 1/235*   (2006.01)
   *B63B 35/04*   (2006.01)
   *F16L 1/12*    (2006.01)
   *F16L 1/16*    (2006.01)

(52) U.S. Cl.
   CPC ............. *F16L 1/19* (2013.01); *F16L 1/225* (2013.01); *F16L 1/235* (2013.01)

(58) Field of Classification Search
   USPC .... 405/158, 165, 166, 168.1, 169, 170, 174, 405/177
   See application file for complete search history.

(56) References Cited

U.S. PATENT DOCUMENTS

| | | |
|---|---|---|
| 6,293,732 B1 | 9/2001 | Baugh |
| 6,328,505 B1 | 12/2001 | Gibble |
| 6,524,030 B1 | 2/2003 | Giovannini et al. |
| 6,729,803 B1 | 5/2004 | Baylot |
| 6,910,848 B1 | 6/2005 | Baugh |
| 7,713,000 B2 | 5/2010 | Verkuijl et al. |
| 2009/0087267 A1* | 4/2009 | Narold .............. B63B 35/03 405/166 |
| 2012/0269579 A1 | 10/2012 | Ardavanis |

FOREIGN PATENT DOCUMENTS

| | | |
|---|---|---|
| WO | WO 2007/094655 A1 | 8/2007 |
| WO | WO 2008/030079 | 3/2008 |
| WO | WO 2009/098586 A2 | 8/2009 |
| WO | WO 2009/148304 A1 | 12/2009 |

OTHER PUBLICATIONS

Communication pursuant to Rule 114(2) EPC, Observations by a Third Party, European Patent Appl. No. 11729684.8, submitted Jan. 29, 2013.

Jensen, G., "Offshore Pipelaying Dynamics", Feb. 2010, Norwegian University of Science and Technology, pp. 1-150.

* cited by examiner

FIG. 4 ation Ser. No. 13/696,845, having a 371(c) date of Jan. 28, 2013, which is a national phase of International Patent Application No. PCT/IB2011/000984, filed May 10, 2011, which claims priority to Italian Patent Application No. MI2010A000829, filed May 10, 2010. The disclosures of each of these patent applications are incorporated by reference herein.

METHOD OF LAYING A PIPELINE FROM A LAYING VESSEL ONTO THE BED OF A BODY OF WATER, AND LAYING VESSEL

CROSS-REFERENCE TO RELATED APPLICATIONS

This application is a continuation of U.S. patent application Ser. No. 13/696,845, having a 371(c) date of Jan. 28, 2013, which is a national phase of International Patent Application No. PCT/IB2011/000984, filed May 10, 2011, which claims priority to Italian Patent Application No. MI2010A000829, filed May 10, 2010. The disclosures of each of these patent applications are incorporated by reference herein.

BACKGROUND

Field

The present invention relates to a method of laying a pipeline from a laying vessel into a body of water.

More specifically, the present invention relates to a method which guides the pipeline along a supporting structure of a laying ramp by means of a number of guide devices spaced along the supporting structure, and releases the pipeline into the body of water at the free end of the laying ramp.

Background

A laying vessel is a floating unit, which comprises a pipeline assembly line, and is equipped at the stern with a laying ramp, which is an extension of the assembly line and serves to ease the pipeline onto the bed of the body of water as the floating unit moves forward.

Laying vessels include S-lay vessels of the above type, as described for example in Patent Application WO 2009/098586 A2, and J-lay vessels of the type described in Patent EP 1,102,698 B1.

In the S-lay method, the pipeline is assembled on a substantially horizontal assembly line and laid off the laying ramp, which, in the work configuration, serves to guide and support the pipeline along a curved path partly above and partly below water level. Pipelines laid this way assume an S shape between the laying vessel and the bed of the body of water, with curves of a radius depending on the rigidity of the pipeline, and can be laid using various types of vessels, such as pontoons, barges, semisubmersibles, and single-hull ships.

Underwater pipeline laying calls for fairly calm water conditions, so much so that, in rough water, laying is suspended, the completed part of the pipeline is abandoned using a winch-controlled cable, and the laying ramp is raised as far as possible above water level into a so-called 'survival configuration'.

The laying ramp normally comprises an inner ramp hinged to the laying vessel, and an outer ramp hinged to the inner ramp, and can assume various work configurations, depending on the depth of the bed and the characteristics of the pipeline; a transit configuration, in which the inner and outer ramps allow unimpeded movement of the laying vessel; and said survival configuration. For which purpose, the laying ramp is connected to the laying vessel by a known actuator assembly, as described for example in the Applicants U.S. Pat. No. 4,257,718.

To guide and move the pipeline forward, the laying ramp comprises a number of guide devices aligned to define the path of the pipeline.

In the J-lay method, the pipeline assembly line is housed at least partly in a J-lay tower hinged to the laying vessel, and the pipeline is guided by a laying ramp normally fixed to the J-lay tower. In this case, too, as described in Patent EP 1,102,698 B1, adjustable guide devices are fitted to the laying ramp supporting structure to guide the pipeline as it is being laid, and to monitor stress between the pipeline and the supporting structure.

In both the above laying methods, stress between the pipeline and the laying ramp supporting structure must be monitored to prevent damage to the pipeline and/or laying ramp. In this connection, it is important to remember that, when laying the pipeline, the laying vessel and ramp, on the one hand, and the pipeline, on the other, are subjected by the water to various forms of stress. The laying vessel, despite being maintained in position and advanced in steps along a given course by a system of mooring lines or a so-called dynamic positioning system comprising thrusters, is still subject to undesired movements caused by waves and water currents. The same wave action and currents also affect the pipeline, but, because of the difference in shape and mass of the laying vessel and the pipeline, and the fact that the pipeline is substantially flexible and rests partly on the bed, produce different movements of the laying ramp and pipeline. Pitching and rolling of the laying vessel are especially hazardous, by causing violent contact between the pipeline and the laying ramp; and known systems of monitoring stress between the pipeline and the laying ramp supporting structure have proved poorly effective in preventing critical pipeline and laying ramp operating conditions.

BRIEF SUMMARY

It is an object of the present invention to provide a method of laying a pipeline from a laying vessel into a body of water, designed to minimize the drawbacks of the known art.

Another object of the present invention to provide a method of laying a pipeline from a laying vessel into a body of water, designed to prevent situations endangering the pipeline and/or laying ramp.

According to the present invention, there is provided a method of laying a pipeline from a laying vessel into a body of water; the method comprising the steps of:

guiding the pipeline along a supporting structure of a laying ramp by means of a number of guide devices;

acquiring an image of the pipeline, preferably in an acquisition plane crosswise to the axis of the pipeline, at the free end of the laying ramp;

determining whether the acquired image is within an acceptance range predetermined as a function of the configuration of the supporting structure and the size of the pipeline; and emitting an error signal when the acquired image is not within the acceptance range.

The present invention has the major advantage of identifying situations in which external agents and movement of the vessel bring the pipeline dangerously close to the supporting structure, and indicating a potential hazard at the free end of the laying ramp, where movements between the pipeline and the supporting structure are greatest.

Preferred embodiments of the present invention may provide for automatically adjusting the guide devices with respect to the supporting structure according to the error signal, and/or adjusting the supporting structure according to the error signal, and/or controlling the position of the laying vessel and/or adjusting the pull on the pipeline by the laying vessel according to the error signal.

All the above steps can prevent hazard situations from getting worse, and prevent accidents.

Another object of the present invention is to provide a laying vessel.

According to the present invention, there is provided a laying vessel for laying a pipeline in a body of water; the laying vessel comprising:
- a laying ramp comprising a supporting structure and a number of guide devices for guiding the pipeline;
- an image acquisition device for acquiring an image of the pipeline, preferably in an acquisition plane crosswise to the axis of the pipeline, at the free end of the laying ramp; and
- a control unit for determining whether the acquired image is within an acceptance range predetermined as a function of the configuration of the supporting structure and the size of the pipeline, and for emitting an error signal when the acquired image is not within the acceptance range.

BRIEF DESCRIPTION OF THE DRAWINGS

A number of non-limiting embodiments of the present invention will be described by way of example with reference to the accompanying drawings, in which.

DETAILED DESCRIPTION

Figure 1:
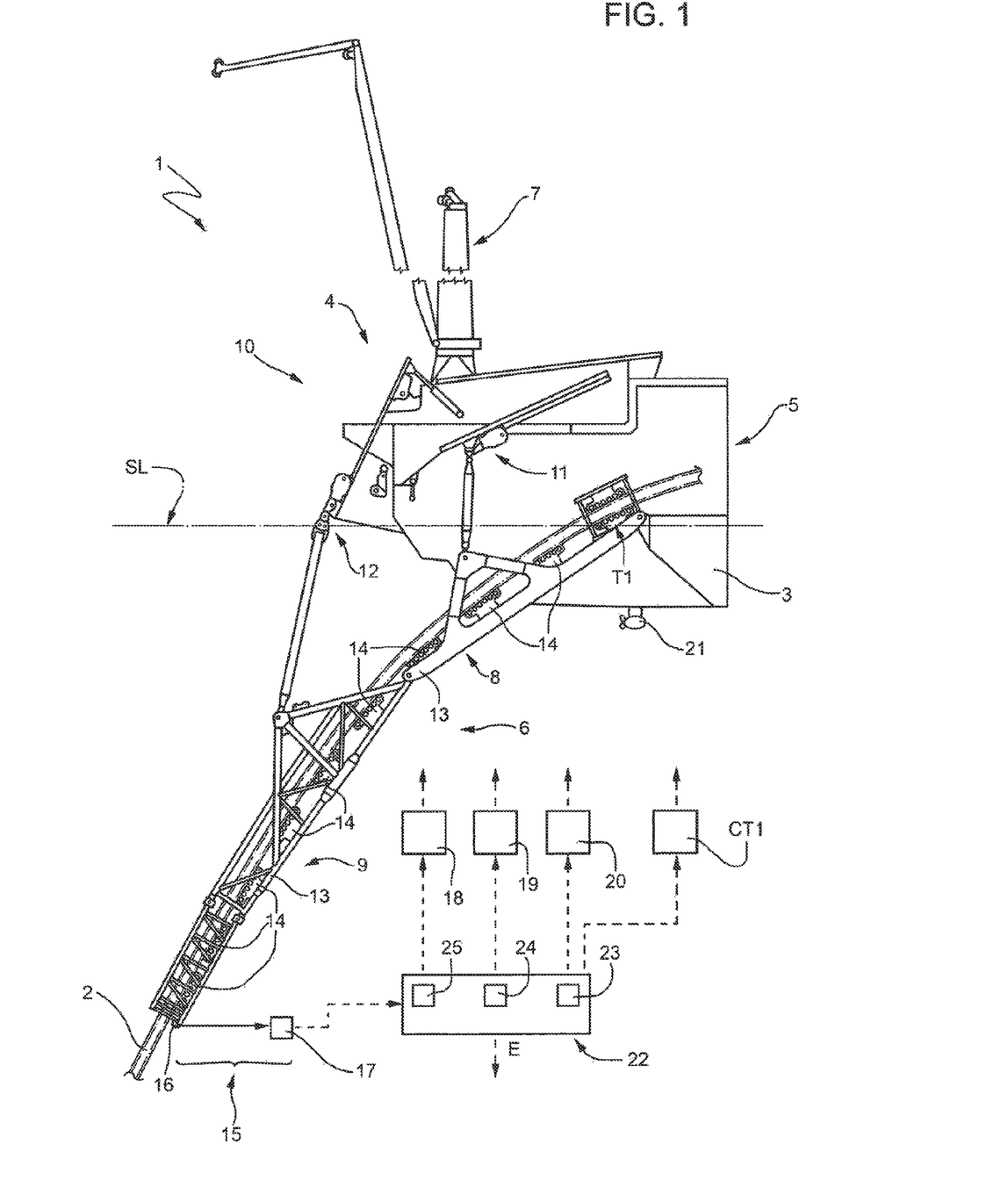
FIG. 1 shows a partly sectioned side view, with parts removed for clarity, of a laying vessel equipped with a laying ramp and in accordance with the present invention.

Number 1 in FIG. 1 indicates a laying vessel for laying a pipeline 2 on the bed (not shown) of a body of water of level SL. In the example shown, laying vessel 1 is a single-hull S-lay ship, and comprises a hull 3; an aftercastle 4; and an assembly line 5 for assembling pipeline 2 from pipes (not shown). Laying vessel 1 is equipped with a laying ramp 6, which defines an extension of assembly line 5 in the FIG. 1 operating configuration, and serves to guide and support pipeline 2 along a path having at least one curved portion, a first portion above water level SL, and a second portion below water level SL.

Laying vessel 1 is equipped, at aftercastle 4, with a crane 7 for performing auxiliary pipeline 2 laying operations.

Laying ramp 6 is hinged to laying vessel 1, and comprises an inner ramp 8 hinged to laying vessel 1, and an outer ramp 9 hinged to inner ramp 8. And laying vessel 1 comprises a drive assembly 10 for setting laying ramp 6 to a number of operating configurations (only one shown in FIG. 1); a transit configuration (not shown), in which both inner and outer ramps 8, 9 are positioned above water level SL; and a survival configuration (not shown in FIG. 1), in which inner and outer ramps 8, 9 are locked as far as possible above water level SL.

Drive assembly 10 comprises two actuators 11, 12 for supporting, controlling, and setting respective inner and outer ramps 8, 9 to the above configurations. In the FIG. 1 laying configuration, inner ramp 8 and outer ramp 9 define respective supporting portions for pipeline 2.

Laying ramp 6 comprises a supporting structure 13, and a number of guide devices 14 spaced along supporting structure 13. In the example shown, inner ramp 8 comprises an inner portion of supporting structure 13, and outer ramp 9 comprises an outer portion of supporting structure 13 hinged to the inner portion of supporting structure 13.

T1 in FIG. 1 indicates a tensioning device, which exchanges a force, preferably a gripping force, with pipeline 2 to exert pull on pipeline 2 to release pipeline 2 from laying vessel 1 in controlled manner, or pull back pipeline 2, or lock pipeline 2 with respect to laying vessel 1.

Figure 2:
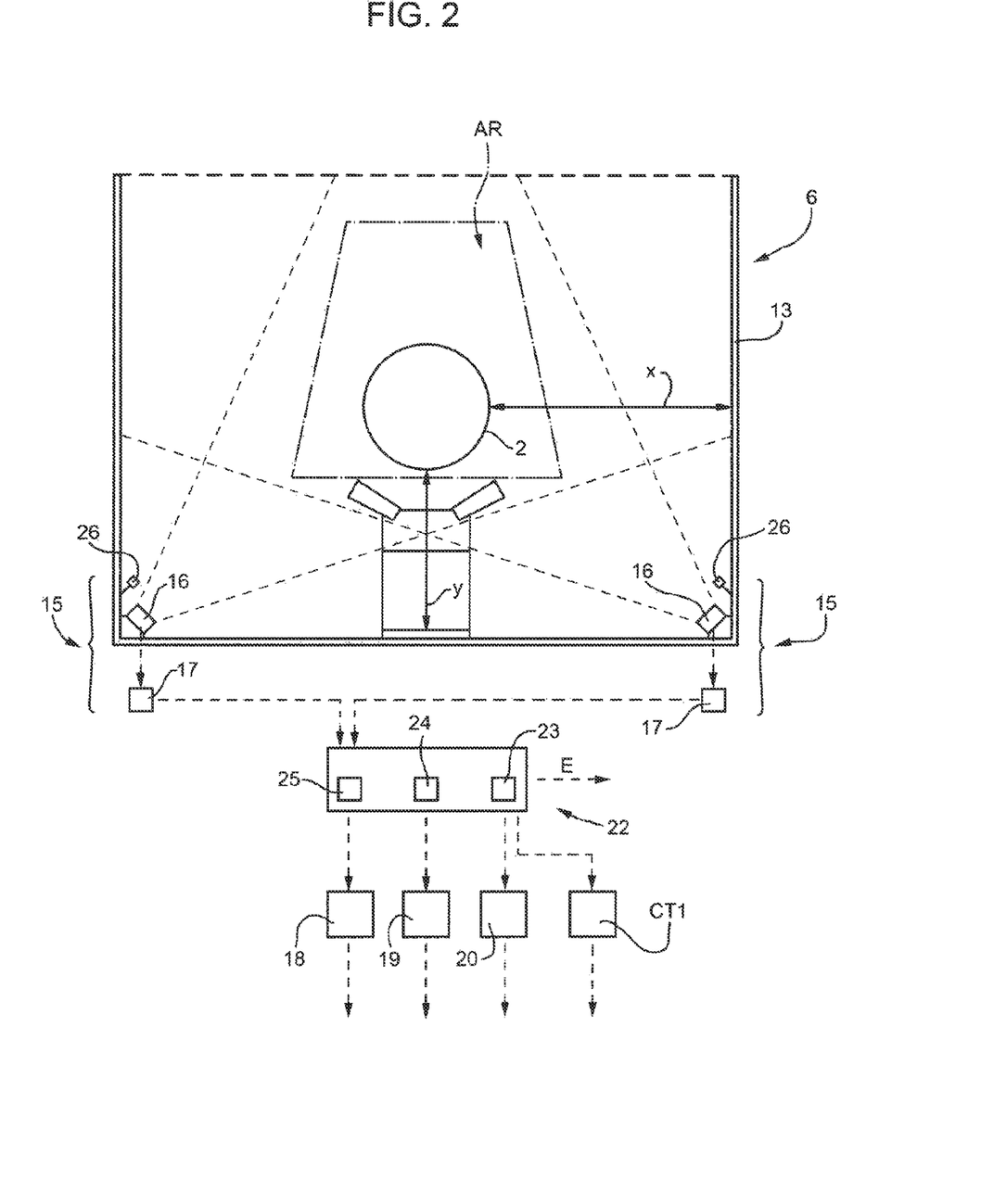
FIG. 2 shows a schematic cross section, with parts removed for clarity, of the FIG. 1 laying ramp.

With reference to FIG. 2, supporting structure 13 extends along three sides defining a space housing pipeline 2. More specifically, FIG. 2 shows the free end of supporting structure 13, where the relative movements between pipeline 2 and laying ramp 6 are greatest. The guide device 14 at the free end of supporting structure 13 does not usually contact pipeline 2, and serves to absorb any shock. Each guide device 14 is damped with respect to supporting structure 13, and has actuators (not shown) for adjusting its active position with respect to supporting structure 13 to optimize load distribution between pipeline 2 and laying ramp 6.

With reference to FIG. 1, laying vessel 1 comprises an image acquisition device 15, in turn comprising a sensor 16, and a processing unit 17 associated with sensor 16.

Laying vessel 1 comprises a control device 18 for controlling drive assembly 10 of laying ramp 6; a control device 19 for controlling guide devices 14; a control device 20 for controlling the position of laying vessel 1—in the example shown, for controlling the dynamic positioning system comprising a number of thrusters 21 (only one shown in FIG. 1); a control device CT1 for controlling tensioning device T1 to adjust the force exchanged between pipeline 2 and tensioning device T1 and, therefore, the pull exerted on the pipeline; and a control unit 22 connected to image acquisition device 15 and control devices 18, 19, 20, and in turn comprising a display 23, a control panel 24, and a memory 25.

With reference to FIG. 2, sensor 16 is fitted to supporting structure 13, at the free end of laying ramp 6, is positioned facing the outer face of pipeline 2, and is designed to define a fan-shaped image acquisition range lying substantially in an acquisition plane perpendicular to the axis of pipeline 2. Sensor 16 is defined by an optical sensor, so image acquisition device 15 preferably comprises a light source 26 fixed to supporting structure 13 to illuminate pipeline 2 in the image acquisition range of sensor 16; and an image processing unit 17 for processing optical images. In a variation, sensor 16 is defined by a sonar, and image processing unit 17 is designed to process acoustic images, so light source 26 is not needed.

Light source 26 is preferably designed to emit a laser beam clearly showing pipeline 2 in the acquisition plane. More specifically, the laser beam is positioned and designed to sweep the whole face of the pipeline in the acquisition plane.

With reference to FIG. 1, the images acquired by image acquisition device 15 are transmitted to control unit 22, where they are compared with images stored in memory 25. The stored images are acceptable real images of the known pipeline 2, or image models reconstructed on the basis of the known dimensions of pipeline 2. In a first comparison mode, the acquired images are compared with the stored images to determine the position of pipeline 2 with respect to the supporting structure, and to determine the X and Y coordinates, which are in turn compared with an acceptance range AR expressed in coordinates.

In a second mode, the stored images define acceptance range AR.

In both modes, control unit 22 emits an error signal E when pipeline 2 does not fall within the acceptance range AR defined substantially by the dash line in FIG. 2. With reference to FIG. 1, the error signal E may be used to correct the configuration of laying ramp 6 and/or guide devices 14, and/or the position of laying vessel 1, and/or the pull exerted on pipeline 2 by tensioning device T1. In other words, control unit 22 is able to automatically control devices 18, 19, 20, CT1 as a function of error signal E and other incoming signals relating to the load transmitted by pipeline 2 to guide devices 14, and to dynamic positioning of laying vessel 1.

Control unit 22 may be set to only operate automatically on some of control devices 18, 19, 20, CT1.

As shown in FIG. 2, laying ramp 6 is also equipped with a further image acquisition device 15 comprising a sensor 16, an image processing unit 17, and a light source 26 in the event sensor 15 is defined by an optical sensor. The further image acquisition device 15 is positioned to acquire images of pipeline 2 in the same acquisition plane as the other image acquisition device 15, but from a different angle. The images acquired by both image acquisition devices 15 are sent to control unit 22 for comparison with respective acceptance ranges, and an error signal E is emitted when the images acquired by at least one image acquisition device 15 do not fall within the respective acceptance range AR. As a result, image acquisition is made more dependable, and the range within which reliable images can be acquired is increased.

The images acquired by both image acquisition devices 15 may also be combined to reconstruct the position of pipeline 2 with respect to laying ramp 6, and determine the distance of the pipeline from laying ramp 6 in the acquisition plane.

Figure 3:
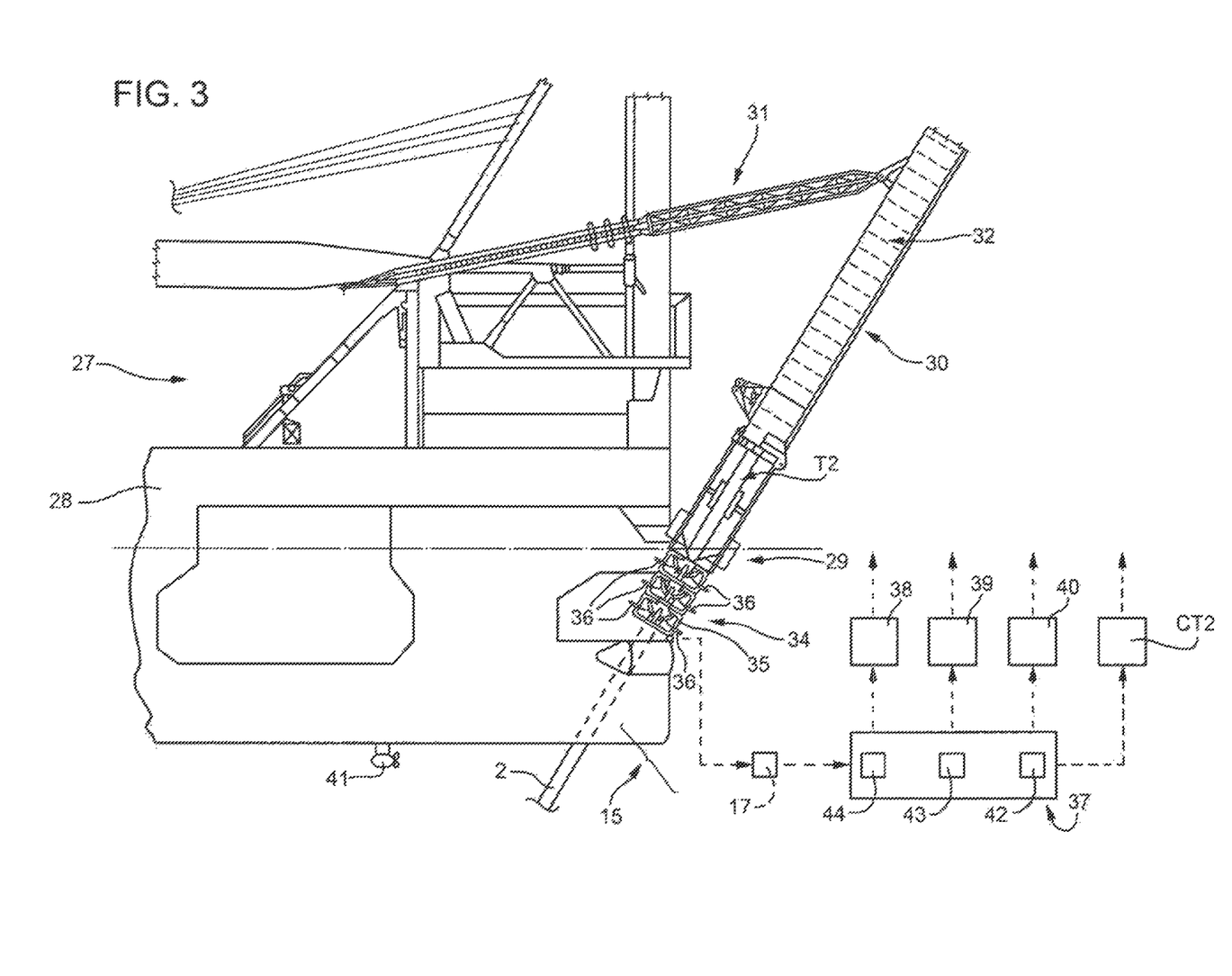
FIG. 3 shows a partly sectioned side view, with parts removed for clarity, of a laying vessel equipped with a laying ramp and in accordance with a further embodiment of the present invention.

Number 27 in FIG. 3 indicates as a whole a semisubmersible laying vessel comprising a double-hull floating structure 28; a hinge assembly 29; a J-lay tower 30 hinged to floating structure 28 by hinge assembly 29; and a drive assembly 31 for orienting J-lay tower 30 about the hinge axis into a number of configurations. The top part of J-lay tower 30 houses an assembly line 32 for assembling pipes (not shown); and the bottom part houses a tensioning device T2 for exchanging a force, preferably a gripping force, with the pipeline, to exert pull on pipeline 2 to release pipeline 2 in a controlled manner, or pull back pipeline 2, or lock the pipeline with respect to laying vessel 27.

The bottom end of J-lay tower 30 is connected to a laying ramp 34, which defines an extension of J-lay tower 30 and, in use, is immersed in the body of water. Laying ramp 34 is connected rigidly to J-lay tower 30, so the configuration of J-lay tower 30 determines the configuration of laying ramp 34.

Laying ramp 34 comprises a supporting structure 35 extending about pipeline 2; and a number of guide devices 36, which are fitted to supporting structure 35, are spaced about pipeline 2 and along supporting structure 35, and are preferably adjustable and controllable by actuators not shown in the drawings.

Laying ramp 34 is equipped with an image acquisition device 15 located at the free end of supporting structure 35 to determine any risk positions of pipeline 2 with respect to laying ramp 34.

Images are acquired in the same way as described for laying ramp 6.

Laying vessel 27 comprises a control unit 37; a control device 38 for controlling drive assembly 31; a control device 39 for controlling guide devices 36; a control device 40 for controlling the movement of laying vessel 27—in this case, dynamic positioning by means of thrusters 41 (only one shown in FIG. 2); and a control device CT2 for controlling the force exchanged between tensioning device T2 and pipeline 2, and therefore the pull exerted on the pipeline. As described with reference to FIG. 1, the acquired images are compared with an acceptance range AR, and control unit 37 emits an error signal E when the acquired images do not fall within acceptance range AR. Control unit 37 comprises a display 42, a control panel 43, and a memory 44, and is designed to both automatically and manually control the position of J-lay tower 30, and/or the position of guide devices 36, and/or the movement of laying vessel 27, and/or the pull exerted on pipeline 2, as a function of error signal E.

Figure 4:
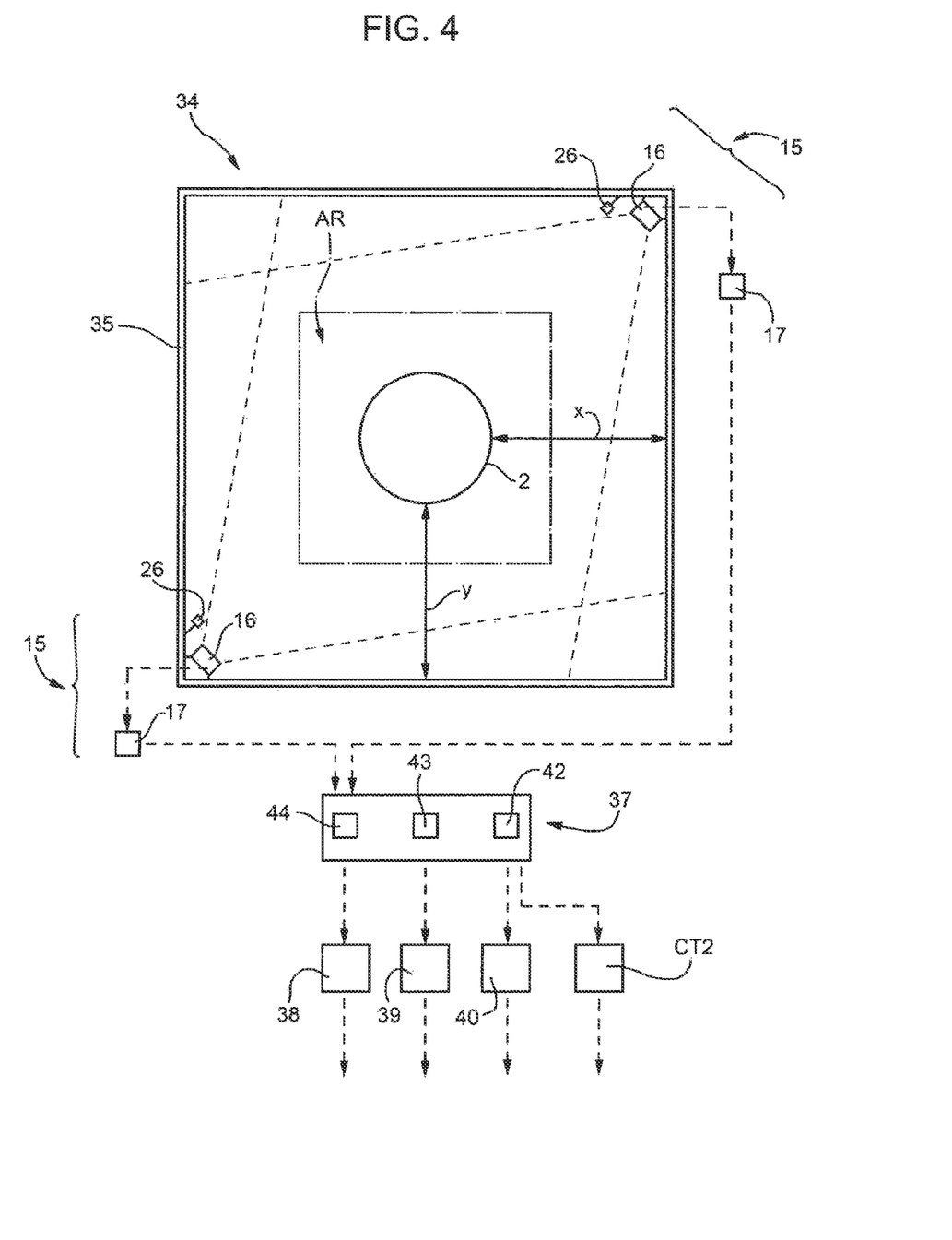
FIG. 4 shows a schematic cross section, with parts removed for clarity, of the FIG. 3 laying ramp.

As shown in FIG. 4, sensor 16 is fitted to supporting structure 35, at the free end of laying ramp 34, and positioned facing the outer face of pipeline 2. In this case, supporting structure 35 completely surrounds pipeline 2, and sensor 16 defines a fan-shaped image acquisition range lying substantially in an acquisition plane perpendicular to the axis of pipeline 2. Sensor 16 is defined by an optical sensor, so image acquisition device 15 preferably comprises a light source 26 fixed to supporting structure 35 to illuminate pipeline 2 in the image acquisition range of sensor 16; and an image processing unit 17 for processing optical images. In a variation, sensor 16 is defined by a sonar, and image processing unit 17 is designed to process acoustic images, so light source 26 is not needed.

As shown in FIG. 4, laying ramp 34 is also equipped with a further image acquisition device 15 comprising a sensor 16, an image processing unit 17, and a light source 26 in the event sensor 15 is defined by an optical sensor. The further image acquisition device 15 is positioned to acquire images of pipeline 2 in the same acquisition plane as the other image acquisition device 15, but from a different angle. The images acquired by both image acquisition devices are processed in the same way as in the previous embodiment.

The main advantages of the present invention lie in preventing the pipeline from assuming critical positions with respect to the laying ramp; enabling immediate intervention to counteract any critical situations; and fairly accurately determining the position of the pipeline with respect to the laying ramp, both in and out of the water.

Clearly, changes may be made to the embodiments of the present invention described herein without, however, departing from the protective scope of the accompanying Claims. For example, ramp 6 may be formed in one rigid piece, or comprise any number of hinged portions.

What is claimed is:

1. A method of laying a pipeline from a laying vessel into a body of water, the method comprising:
    guiding the pipeline along a supporting structure of a laying ramp;
    acquiring a first image of a first face of the pipeline and a second image of a second face of the pipeline in a same acquisition plane as the first image, the acquisition plane being crosswise to an axis of the pipeline;
    determining whether the acquired first image and the acquired second image are within respective acceptance ranges predetermined as a function of a configuration of the supporting structure and a size of the pipeline;
    emitting a control signal when at least one of the acquired first image and the acquired second image is not within the respective acceptance range; and determining a distance between the pipeline and the supporting structure at a free end of the laying ramp;
wherein determining whether the acquired first image and the second image are within the respective acceptance ranges comprises processing the acquired first image and the acquired second image to compare the acquired first image and the acquired second image to information stored in a memory.

2. The method as claimed in claim 1, further comprising adjusting the guiding of the pipeline with respect to the supporting structure as a function of the control signal.

3. The method as claimed in claim 1, further comprising altering a configuration of the supporting structure as a function of the control signal.

4. The method as claimed in claim 1, further comprising controlling a position of the laying vessel as a function of the control signal.

5. The method as claimed in claim 1, further comprising controlling a force exchanged between a tensioning device and the pipeline, so as to control pull exerted on the pipeline as a function of the control signal.

6. The method as claimed in claim 1, wherein the first image is an acoustic image of the first face of the pipeline, and wherein the second image is an acoustic image of the second face of the pipeline.

7. The method as claimed in claim 1, wherein the first image is an optical image of the first face of the pipeline, and wherein the second image is an optical image of the second face of the pipeline.

8. The method as claimed in claim 1, wherein the information stored in the memory is a real image or a modeled image reconstructed based on known dimensions of the pipeline.

9. A laying vessel for laying a pipeline in a body of water, the laying vessel comprising:
a laying ramp comprising a supporting structure and a plurality of guide devices configured to guide the pipeline;
a first image acquisition device configured to acquire a first image of a first face of the pipeline;
a second image acquisition device configured to acquire a second image of a second face of the pipeline, the first image and the second image being in a same acquisition plane crosswise to an axis of the pipeline, in the body of water; and
a control unit configured to
determine whether the acquired first image and the acquired second image are within respective acceptance ranges predetermined as a function of a configuration of the supporting structure and a size of the pipeline by processing the acquired first image and the acquired second image to compare the first image and the second image to information stored in a memory,
emit a control signal when the acquired first image or the acquired second image is not within the respective acceptance range, and
determine the distance between the pipeline and the supporting structure at the free end of the laying ramp.

10. The laying vessel as claimed in claim 9, further comprising a control device connected to the control unit, configured to control a variable configuration of the guide devices, and configured to alter the configuration of the guide devices with respect to the supporting structure as a function of the control signal.

11. The laying vessel as claimed in claim 9, further comprising:
a drive assembly configured to alter a configuration of the laying ramp; and
a control device configured to control the drive assembly as a function of the control signal.

12. The laying vessel as claimed in claim 9, further comprising:
a floating structure;
a J-lay tower hinged to the floating structure;
a drive assembly configured to alter a configuration of the J-lay tower; and
a control device configured to control the drive assembly and the configuration of the J-lay tower as a function of the control signal.

13. The laying vessel as claimed in claim 9, further comprising a control device connected to the control unit and configured to control a position of the laying vessel as a function of the control signal.

14. The laying vessel as claimed in claim 9, further comprising:
a tensioning device configured to exchange a force with the pipeline and exert pull on the pipeline; and
a control device connected to the control unit and configured to control the force exchanged between the tensioning device and the pipeline so as to control the pull exerted on the pipeline as a function of the control signal.

15. The laying vessel as claimed in claim 9, wherein the control unit is configured to determine a distance between the pipeline and the supporting structure at the free end of the laying ramp.

16. The laying vessel as claimed in claim 9, wherein the first image acquisition device and the second image acquisition device each comprise a sensor fitted to the laying ramp to define a fan-shaped acquisition range extending along the acquisition plane; and a processing unit.

17. The laying vessel as claimed in claim 9, wherein the first image acquisition device and the second image acquisition device each comprise a light source configured to emit a laser beam that sweeps a whole face of the pipeline along the acquisition plane.

18. A laying vessel for laying a pipeline in a body of water, the laying vessel comprising:
a laying ramp comprising a supporting structure and a plurality of guide devices configured to guide the pipeline;
a first image acquisition device configured to acquire a first image of a first face of the pipeline;
a second image acquisition device configured to acquire a second image of a second face of the pipeline, the first image and the second image being in the same acquisition plane crosswise to an axis of the pipeline, in the body of water; and
a control unit comprising a memory, and configured to
determine whether the acquired first image and the acquired second image are within respective acceptance ranges stored in the memory,
emit a control signal when the acquired first image or the acquired second image is not within the respective acceptance range, and
determine a distance between the pipeline and the supporting structure at the free end of the laying ramp.

19. A laying vessel for laying a pipeline in a body of water, the laying vessel comprising:

a laying ramp comprising a supporting structure and a plurality of guide devices configured to guide the pipeline;
a first image acquisition device configured to acquire a first image of a first face of the pipeline;
a second image acquisition device configured to acquire a second image of a second face of the pipeline, the first image and the second image being in a same acquisition plane crosswise to an axis of the pipeline, in the body of water;
a memory configured to store a first acceptance range for the acquired first image and a second acceptance range for the second acquired image; and
a control device configured to
  adjust guiding of the pipeline along the supporting structure as a function of the acquired first image, the acquired second image, and the first and second acceptance ranges stored in the memory, and
  determine a distance between the pipeline and the supporting structure at the free end of the laying ramp.

* * * * *